No. 784,107. Patented March 7, 1905.

UNITED STATES PATENT OFFICE.

HEINRICH CARL FEHRLIN, OF SCHAFFHAUSEN, SWITZERLAND.

PROCESS OF MAKING COMPOUNDS OF PYROCATECHUICMONOALKYL ETHERS.

SPECIFICATION forming part of Letters Patent No. 784,107, dated March 7, 1905.

Application filed January 14, 1904. Serial No. 189,002.

*To all whom it may concern:*

Be it known that I, HEINRICH CARL FEHRLIN, a citizen of the Republic of Switzerland, residing at Schaffhausen, in Switzerland, have invented new and useful Improvements in Processes for the Production of Compounds of Pyrocatechuicmonoalkyl Ethers, and Especially of Guaiacol and Guaethol with Protein Substances, of which the following is a specification.

It is known that compounds of albuminous and pepton-like division products of the proteins can be produced with aromatic bodies by heating the proteins with mono or more valent phenols or aromatic amins. For instance, dry egg-albumen is heated with ten times the quantity of phenol in the water-bath, and from the solution thus prepared a compound of phenol with albumen is precipitated with alcohol. The triphenyl albumen thus produced is, however, absolutely a worthless compound therapeutically, because it forms a good culture-ground for bacteria and is subject to fermentation, like ordinary albumen. Further, proteins have been heated with mono or poly valent phenols to temperatures above 150° centigrade, and in this manner attempts have been made to obtain compounds useful in medicine of guaiacol with albumen. For this purpose one hundred grams of albumen and two hundred grams of guaiacol have been heated to about 200° centigrade for about five hours. The product of the reaction of guaiacol upon albumen produced in this manner must be dissolved in alcohol and the solution poured in a thin stream into ether. The mass, which first separates in a flocculent state, soon combines into a tough paste. The operation is repeated several times and the product dissolved in alcohol, which is then evaporated *in vacuo* upon the water-bath. There then remains a brown lamellated mass. The use of the high temperature of 200° centigrade and the tedious operations following the heating render the process very complicated and dear, and the products thereby produced possess certain drawbacks which render impossible a therapeutic application thereof, as is obvious from the use of the large excess of guaiacol required for the reaction, which must necessarily produce caustic products. Further, it appeared to me to be desirable to discover albuminates of guaiacol which in contradistinction to the above-mentioned products should be insoluble both in alcohol and in water, so that they can pass through the stomach under all circumstances undissolved and be only broken up and absorbed by means of the alkaline bowel secretions. There are, moreover, also compounds of phenol derivatives with proteins known which have the property of being insoluble in the gastric juice. For instance, such tannic-acid compounds have been prepared. Tannic acid, however, distinguishes itself both in its compounds with proteins and in its ordinary properties, especially through its physiological and therapeutic reactions, so considerably from guaiacol and other ethers of pyrocatechuic acid and their compounds that the important advantage and the new technical effect which is produced by the formation of albuminates of guaiacol of the desired properties will at once be obvious. The compounds of tannic acid of course possess none of the valuable therapeutic properties which belong to the guaiacol and guaethol albuminates. While the tannic-acid compounds only find application as astringent remedies, the guaiacol albuminate is suitable on account of its excellent antiseptic and healing power for the successful treatment of tuberculous diseases. On the other hand, there have hitherto been no guaiacol preparations which are insoluble under all circumstances in the gastric juice. The one of the previously-known preparations which in this respect appeared to promise the most—namely, guaiacol carbonate—is split up in the stomach into guaiacol and carbonic acid in conditions present in the diseased state. Moreover, this, as well as all other guaiacol preparations, is more or less soluble in alcohol or water, whereas my albuminate of guaiacol is insoluble in both, even in dilute or hot alcohol. Apart from its insolubility in the gastric juice this guaiacol albuminate has the advantage over all other guaiacol preparations in that the guaiacol can be introduced into the body in its most effective and uninjurious form, whereas in the socalled "thiocol" the reaction of the guaiacol is naturally so diminished by the sulfo group that the thiocol does not possess any antiseptic properties at all. Moreover, it was to be expected that a supply of albumen in the taking of the albuminate of guaiacol also exercises a healing influence which must not be undervalued upon the condition of nutrition of the patient. There is therefore a considerable advance in the treatment with guaiacol now that I have succeeded in preparing a pure guaiacol albuminate insoluble in alcohol, in water, or in dilute acids, but soluble in dilute alkalies.

In order to minimize the very caustic and poisonous reaction of creosote, it is recommended to mix the same with milk before using it as medicine. It is possible that in this manner there are formed partial combinations with the creosote which resemble the production of albumen compounds. Such compounds have, however, never yet been isolated and examined separately for their therapeutic effect. In the fluctuating composition of creosote a determination of the reactions found would, moreover, hardly be possible. Creosote consists of from fifty to sixty per cent. of guaiacol and cresol and contains, moreover, in various proportions methyl-cresol, cresol, and xylenol. Further, the fluctuating composition of the milk must be regarded. Consequently if actually certain albumen compounds of these bodies contained in creosote should be produced by mixing with milk, then such mixtures (like creosote itself) are liable to the great drawback that they contain uncertain and fluctuating mixtures of quite different bodies, which, like creosote itself, exclude any exact medicinal examination and certain application, because they are never constant and reliable in their therapeutic reactions. My discovery, on the other hand, aims at the concrete operation of producing a compound which is a definite, new, and therapeutically very valuable product, in comparison with which creosote and all its compounds are left far behind. It was consequently of the greatest importance to discover an albumen preparation which is prepared, for instance, from the purest guaiacol and the purest egg-albumen and which would have the necessary properties for a well-calculated medicinal application.

I have now discovered that guaiacol and guaethol albuminates possessing the requisite properties can be very simply and cheaply prepared by, for instance, mixing watery solutions of egg-albumen with guaiacol or guaethol in the cold and agitating until a thick paste is produced which can then be separated by a suction filter or a centrifugal machine and finally dried. In like manner the reaction is produced if dilute alkaline solutions of guaiacol or guaethol are mixed with aqueous solutions of albumen in the cold and then dilute hydrochloric acid is added with constant stirring. There is produced as before a thick paste, which also can be separated by a centrifugal, washed, and dried. In both instances in order to hasten the formation of a thick coagulum the liquid can be warmed before putting it in the centrifugal. My process distinguishes itself, therefore, from those hitherto known in that combinations of albumen and guaiacol or guaethol can be obtained even in the cold.

With proteins which do not coagulate, such as peptones and albumoses, the reaction is completed in the cold more slowly; but the products in question are likewise produced quite easily if the components alone or with admixtures of harmless solvents are heated on the water-bath. My process therefore distinguishes itself even in this case from those hitherto known in that the temperature of a water-bath is the highest employed, whereas the processes hitherto known for the condensation of guaiacol with albumen were characterized by treating the proteins with guaiacol, preferably under pressure, at a temperature of about 200° centigrade, after which, moreover, a number of complicated and expensive manipulations followed and still only compounds were obtained which were therapeutically valueless. The compound of guaiacol and albumen hitherto known is, moreover, an unstable product. It forms when freshly prepared a brown lamellated mass which can certainly be preserved in hermetically-closed vessels, but if left lying exposed to the air soon softens into a dark, unpleasant, and useless mass. The compound, moreover, has a very disagreeable and disgusting odor and taste and causes, even when taken in the smallest doses, sickness, heart-beating, vomiting, and pain in the stomach, so that a therapeutic application of this product is quite impossible. It corresponds, consequently, neither to the requirement of medicine nor to that of the industry of medical preparations. My albuminate of guaiacol, on the contrary, is permanently preservable, corresponds to all industrial requirements, and has already proved itself an excellent medicine, inasmuch as it has been taken with great benefit by many patients in doses up to three grams and more daily without causing the slighest unpleasant reaction upon the organism.

*Examples of the Method of Preparation.*

1. One kilogram of egg-albumen is dissolved in ten liters of water and under constant stirring or shaking six hundred and fifty grams of guaiacol in the melted state or dissolved in alcohol are poured in. The emulsion thus produced thickens after a short time into a thick paste, while the corresponding pyrocatechuic ether disappears. The gelatinous white reaction product is either filtered under pressure immediately or after a short heating, or it is partly dried in a centrifugal machine and then desiccated. The drying is best effected at a low temperature in a vacuum drying apparatus provided with stirrers and coolers. The distillate, which contains a small quantity of guaiacol partly suspended, partly in solution, is mixed with the previously-obtained liquid from the centrifugal and used for the next portion. The product dried as stated is finally heated for several hours at from 115° to 120° centigrade in order to render it completely indigestible by the gastric juice. It is then again washed several times with an indifferent solvent, such as toluol, and again dried. It then forms a light-brown powder which contains about twenty-five per cent. of guaiacol firmly united and possesses a slight smell and taste of the pyrocatechuic ether employed. It is practically insoluble in water and in the usual solvents, such as alcohol, &c., as also in dilute acids. In dilute alkalies, however, it is slighly soluble even in the cold, but much more quickly on heating, and from this solution the guaiacol or guaethol can be again isolated by acidulating and ethering it out or distilling off in a current of steam. One hundred grams of albumen give about eighty grams of guaiacol albuminate.

2. Six hundred and fifty grams of guaiacol are dissolved in the corresponding quantity of a very dilute caustic-soda solution, and this solution is added to a solution of one kilogram egg-albumen in ten liters of water. Hereupon the mixture is acidulated with dilute hydrochloric acid under constant stirring. It is then heated on the water-bath, the coagulum is separated in a centrifugal machine, washed and dried at a low temperature, and finally heated at from 115° to 120° centigrade. The product is practically insoluble in water and in the usual solvents, such as alcohol, &c., as also in dilute acids.

3. One kilogram of casein is mixed with two kilograms of alcohol and one hundred and fifty grams of guaiacol and heated for several hours upon the water-bath. The reaction product is washed with alcohol and then dried and it forms a somewhat dark-colored powder, quite similar to casein. This product is also practically insoluble in water and in the usual solvents, as alcohol, &c., as also in dilute acids.

4. One kilogram of somatose is heated with alcohol and one hundred and fifty grams of guaiacol or guaethol upon the water-bath and the reaction product is treated as set forth under paragraph 3. There is formed a brown powder completely soluble in water, having a slight aromatic smell and taste.

Quite similar combinations with the pyrocatechuicmonoalkyl ethers are obtained with other unmodified or modified proteins from any source and method of preparation—such as serum-albumen, lactol-albumen, gelatin, or the well-known peptones and albumoses— and other preparations, such as nutrose, sanatogen, sanatose, tropone, &c.

The guaiacol and guaethol compounds, especially those which are insoluble in alcohol and water, are intended for application as antiphtysics and antidiarrhea specifics. The advantages of these albumen compounds as compared with all previously-known guaiacol and guaethol preparations consist in that by this means the guaiacol and guaethol can be introduced into the body of the patient in a more effective form than has hitherto been possible by any other preparation hitherto known. Their effectiveness in stopping coughs and acting as antidiarrhea remedies is positively astonishingly quick. Moreover, the preparations are entirely free of caustic property or poisonousness, they cause no nausea, stomach-pressure, or constipation, and can therefore be applied with success even with children. Moreover, being albumen compounds of high molecular constitution, they are very permanent in the body and exercise, therefore, very bactericidal action for a long time and react constantly, not only as curative, but also as prophylactic.

Having now particularly described and ascertained the nature of my said invention and in what manner the same is to be performed, I declare that what I claim is—

1. The process, which consists in reacting upon a solution of a protein with a pyrocatechuicmonoalkyl ether, separating the reaction product and drying the same.

2. The process, which consists in reacting upon a solution of a protein at a temperature above normal with a pyrocatechuicmonoalkyl ether, separating the reaction product, and drying the same.

3. The process, which consists in reacting upon a solution of a protein at a temperature above normal with a pyrocatechuicmonoalkyl ether, separating the reaction product, drying, and then heating the same to from about 115° to 120° centigrade.

4. The process, which consists in reacting upon a solution of a protein with a pyrocatechuicmonoalkyl ether in the presence of a suitable acid, separating the reaction product and washing and drying the same.

5. The process, which consists in reacting upon a protein in the presence of an indifferent solvent with a pyrocatechuicmonoalkyl ether at a temperature above normal and separating the reaction product, for the purposes set forth.

6. The process, which consists in reacting upon a protein with a pyrocatechuicmono-alkyl ether, separating the reaction product and heating the same to from about 115° to 120° centigrade, for the purpose set forth.

7. The process, which consists in reacting upon a solution of a protein with a solution of an alkaline salt of a pyrocatechuicmonoalkyl ether, acidulating the mixture with hydrochloric acid, heating the same and separating the reaction product, for the purpose set forth.

8. The process, which consists in reacting upon a solution of a protein with a solution of an alkaline salt of a pyrocatechuicmonoalkyl ether, acidulating the mixture with hydrochloric acid, heating the same and separating the reaction product, washing and drying and then heating said product to from about 115° to 120° centigrade, for the purpose set forth.

9. The process, which consists in reacting upon an aqueous solution of albumen with a pyrocatechuicmonoalkyl ether and separating the reaction product, then washing and drying said product and heating the same to from 115° to 120° centigrade, for the purpose set forth.

10. The process, which consists in reacting upon an aqueous solution of albumen with a pyrocatechuicmonoalkyl ether and separating the reaction product, then washing and drying said product and heating the same from 115° to 120° centigrade, and finally washing and drying the product, for the purpose set forth.

11. The process, which consists in mixing a solution of albumen with a solution of an alkaline salt of a pyrocatechuicmonoalkyl ether, acidulating the mixture with hydrochloric acid, heating the same and separating the reaction product, for the purpose set forth.

12. The process, which consists in reacting upon a solution of a protein with melted guaiacol, and separating the reaction product.

13. The process, which consists in reacting upon a solution of a protein with melted guaiacol, separating the reaction product and drying the same.

14. The process, which consists in reacting upon a solution of a protein with melted guaiacol, separating and drying the reaction product, and then heating the latter to from about 115° to 120° centigrade.

15. The process, which consists in mixing a solution of a protein with a solution of an alkaline salt of guaiacol, acidulating the mixture with hydrochloric acid, heating said mixture and separating the reaction product, for the purpose set forth.

16. The process, which consists in mixing a solution of albumen with a solution of an alkaline salt of guaiacol or guaethol, acidulating the mixture with hydrochloric acid, heating said mixture and separating the reaction product, for the purpose set forth.

17. The herein-described desiccated product consisting essentially of a protein chemically combined with a pyrocatechuicmonoalkyl ether, said product soluble in alkaline solutions and insoluble in water, alcohol and dilute acids.

18. The herein-described desiccated product, consisting essentially of a protein chemically combined with guaiacol, said product soluble in alkaline solutions but insoluble in water, alcohol and dilute acids.

19. The herein-described desiccated product, consisting essentially of egg-albumen chemically combined with guaiacol.

In testimony whereof I have signed my name to this specification in the presence of two subscribing witnesses.

HEINRICH CARL FEHRLIN.

Witnesses:
   A. LIEBERKNECHT,
   E. BLUM.